United States Patent [19]

Abiko

[11] Patent Number: 4,688,205

[45] Date of Patent: Aug. 18, 1987

[54] DATA DEMODULATION APPARATUS

[75] Inventor: Takashi Abiko, Kawasaki, Japan

[73] Assignee: Kabushiki Kaisha Toshiba, Kawasaki, Japan

[21] Appl. No.: 748,962

[22] Filed: Jun. 26, 1985

[30] Foreign Application Priority Data

Jun. 30, 1984 [JP] Japan .............................. 59-135961

[51] Int. Cl.⁴ ........................ G11B 20/10; G11B 5/09
[52] U.S. Cl. ....................................... 369/59; 360/51
[58] Field of Search ..................... 369/59, 48; 360/51; 331/11, 12, 25

[56] References Cited

U.S. PATENT DOCUMENTS 4,495,474  1/1985  Nishikawa et al. .................. 369/59
4,611,319  9/1986  Naito ..................................... 369/59

OTHER PUBLICATIONS

Floyd M. Gardner, Ph.d., "Phaselock Techniques", 2. Aufl., New York, Chichester, Brisbane, Toronto, 1979, John Wiley & Sons, S. 84–87, 166–169.

Primary Examiner—Vincent P. Canney
Attorney, Agent, or Firm—Cushman, Darby & Cushman

[57] ABSTRACT

A data demodulation apparatus comprises an optical head for reading out code data from a recording medium, the code data having been modulated according to the timing of a clock pulse of a predetermined frequency and recorded in the recording medium, a reproduction pulse generating PLL circuit supplied with the clock pulse and the code data, and for generating a reproduction pulse synchronized in phase and frequency with the clock pulse in a first mode, and a reproduction pulse synchronized in phase with the code data in a second mode, and means for demodulating the code data according to the timing of the reproduction pulse. The frequency of the reproduction pulse is detected by a detector circuit. The frequency of the reproduction pulse is compared with that of the clock pulse. When a difference between both frequencies is within a tolerable range, the PLL circuit is set in the second mode. When a difference between both frequencies is not within the tolerable range, it is set in the first mode.

5 Claims, 9 Drawing Figures

FIG.6A (CLOCK PULSE)
FIG.6B (REP. PULSE)
FIG.7A (CLOCK PULSE)
FIG.7B (REP. PULSE)
FIG.8A (CODE DATA)
FIG.8B (REP. PULSE)
FIG.9A (CLOCK PULSE)
FIG.9B (REP. PULSE)
FIG.9C (CHECK LENGTH PULSE)

DATA DEMODULATION APPARATUS

BACKGROUND OF THE INVENTION

The present invention relates to a data demodulation apparatus in use for an image filing system for recording and reproducing image data by using an optical disc.

To store a large number of documents as produced in offices, etc., the image filing system using the optical disc has been widely used. In this system, an original such as a document is optically scanned in a two dimensional manner. The optical image data thus obtained is converted into the corresponding electrical image data. Such data is recorded into an optical disc. If the document recorded is needed later, it is retrieved and reproduced, and printed out on a record paper or displayed by a CRT display device. For obtaining a high density recording of the image data, the electrical image data is 2-7 code converted (modulated) before recording. To reproduce the image data, it is converted by the process reverse to that of the 2-7 code conversion (demodulation).

For the demodulation, the clock pulse which has been used for modulating the data, is required for the reproduction pulse. When the rotating speed of the optical disc is temporarily changed, the phase of the code data also changes. In demodulating such code data, since the reproduction pulse has fixed phase and frequency, an improper demodulation of the code data is performed. To cope with this, the reproduction pulse is phase synchronized with the code data. The reproduction pulse is first synchronized in phase and frequency with the clock pulse, and then in phase with the code data. In the prior art system, once the frequency of the reproduction pulse is equal to that of the clock pulse, the phase of the reproduction pulse is controlled so as to coincide with that of the clock pulse irrespective of the frequency of the reproduction pulse. When the PLL circuit suffers from noise, the frequency of the reproduction pulse is shifted from its correct one. However, the prior art system can not correct such a shift. This often results in incorrect demodulation of the code data.

SUMMARY OF THE INVENTION

Accordingly, an object of the present invention is to provide a data demodulation apparatus which detects the frequency of the reproduction pulse and automatically corrects the shifted frequency of the reproduction pulse when it is shifted above the tolerable range from the reference frequency of the clock pulse, thereby always ensuring the correct demodulation of the code data.

According to the present invention, there is provided a data demodulation apparatus comprising means for reading out code data from a recording medium, said code data having been modulated at the timing of a clock pulse with a predetermined frequency and recorded in said recording medium, means supplied with said clock pulse and said code data, and for generating a reproduction pulse synchronized in both phase and frequency with said clock pulse in a first mode or pull-in control mode, and a reproduction pulse synchronized in phase with said code data in a second mode or lock-in control mode, means for demodulating code data at the timing of said reproduction pulse, means connected to said reproduction pulse generating means, and for comparing the frequency of said reproduction pulse with that of said clock pulse, said means setting said reproduction pulse generating means in the second mode when both the frequencies are equal to each other, and in the first mode when the frequencies are not equal.

DETAILED DESCRIPTION OF THE PREFERRED EMBODIMENTS

Figure 1:
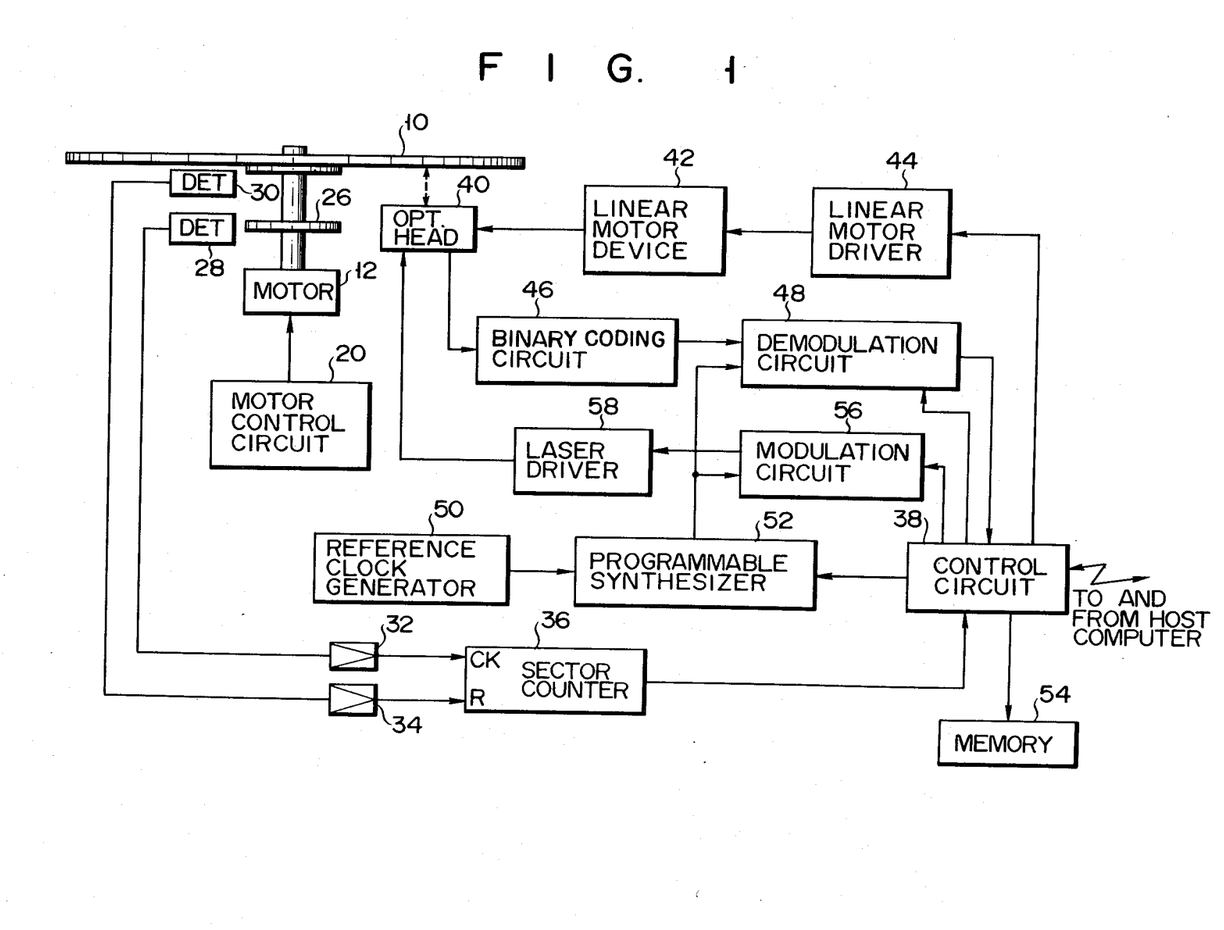
FIG. 1 shows a block diagram of an image filing system into which an embodiment of a data demodulation apparatus according to the present invention is incorporated.
Figure 2:
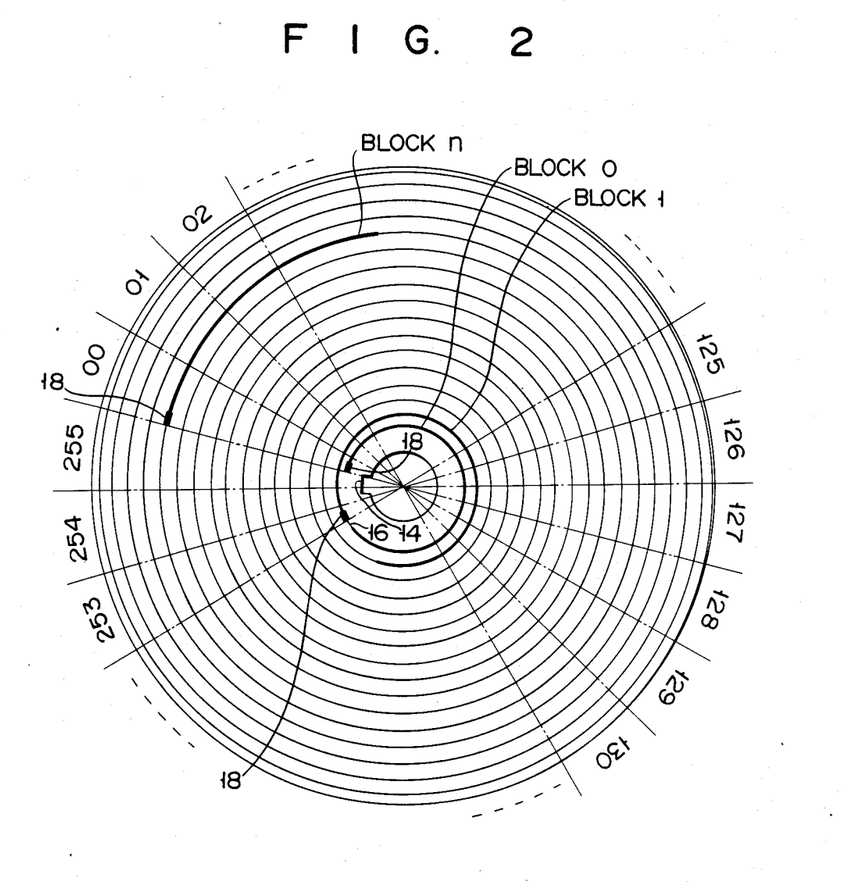
FIG. 2 shows a plan view of an optical disc as a recording medium.

An embodiment of a data demodulation apparatus according to the present invention will be described referring to the accompanying drawings. FIG. 1 illustrates in block form an image filing system containing a data demodulation circuit as the embodiment of the present invention. An optical disc 10 as a recording medium is driven at a constant speed by a motor 12. A plan view of the optical disc 10 is shown in FIG. 2. In the structure of the optical disc 10, a metal layer made of tellurium, bismuth, or the like is coated over the surface of a disc substrate made of glass, plastic or the like in a doughnut fashion, except the central portion of the substrate. The metal layer at the central portion of the disc is outwardly cut away to form a reference position mark 14, as shown in FIG. 2. Data is recorded on the optical disc 10 along a single spiral track. To specify radial positions on the disc, however, the track is segmented for each turn into a number of track turns, and these segmented track turns are numbered 0, 1, ... , 35999 from the center to the periphery of the disc. To specify the circumferential positions on the disc, the optical disc is circumferential segmented into 256 sectors. Numbers 0, 1, ... , 255 are assigned to these sectors. The sector adjacent to the sector containing the reference mark 14, as clockwise viewed in the drawing, is numbered 0. The sector located further to the right of the sector 0, is numbered 1. In this way, the sectors are successively numbered clockwise on the disc. The data is recorded on the disc every block consisting of a plurality of sectors. Image data with variable length are recorded in a plurality of blocks on the disc. In this example, 300,000 blocks are formed for 36,000 tracks. Each block is formed by equally dividing one spiral track into 300,000 segments. Therefore, the number of sectors in one block on the inner side track, i.e. closer to the central portion of the disc, is not equal to that on the outer side or peripheral side track. For example, one block consists of 40 sectors on the innermost track, while one block consists of 20 sectors on the outermost track. The boundaries of the blocks, which are formed by equally dividing the single spiral track into 300,000 segments are not always coincident with those of the sectors. For example, in FIG. 2, the block 0 terminates before the sector 253 begins. In this case, a block gap 16 is formed between the blocks 0 and 1, to ensure that each block begins at the boundary between the adjacent sectors. At the head of each block, a block header 18 including a block number, a track number, and the like is recorded in the factory. These blocks, like the tracks, are numbered from the inner side to the outer side, as 0, 1, ..., 299,999.

Figure 3:
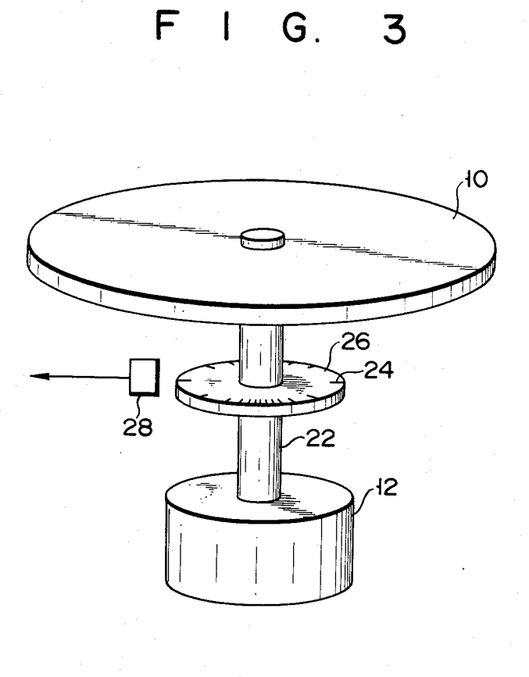
FIG. 3 shows a perspective view of an optical disc and its related components, which are used in the filing system of FIG. 1.

The motor 12 is a spindle motor rotating at a fixed speed (600 rpm) under control of a motor control circuit 20. A disc 26 is fixed to the shaft 22 of the motor 12, as shown in FIG. 3. Marks 24 for signal generation are equidistantly marked on the peripheral portion of the disc 26. The number of the marks 24 is equal to that of the sectors, and are positioned at the boundaries of the sectors, respectively. These marks 24 are optically detected by a detector 28 as a combination of a light emitting diode and a light sensing element.

Returning to FIG. 1, disposed under the optical disc 10 is a detector 30 made up of a light emitting diode and a light sensing element. The detector 30 is for optically sensing the reference position mark 14 at the center of the optical disc 10. The output signal of the detector 28 is supplied through an amplifier 32 to the clock terminal CK of a sector counter 36. The output signal of the detector 30 is supplied through an amplifier 34 to the reset terminal R of the sector counter 36. The output signal of the sector counter 36 is supplied to a control circuit 38. Using a counted value of the sector counter 36, the control circuit 38 controls an access by the optical head 40 to the sectors on the optical disc 10. An optical head 40 for recording and reproducing data is also disposed under the optical disc 10. The optical head 40 is of the well known type, and comprises a semiconductor laser oscillator, a collimating lens, a beam splitter, a λ/4 wave length plate, an objective, a light sensing element, and the like. A linear motor device 42 and a linear motor drive 44 are provided for controlling an access by the optical head 40 to the tracks on the optical disc 10. The linear motor device 42 is for moving the optical head 40 in the radial direction on the optical disc 10. The amount of movement of the optical head 40 is controlled by the control circuit 38 through the aid of the linear motor driver 44.

Figure 4:
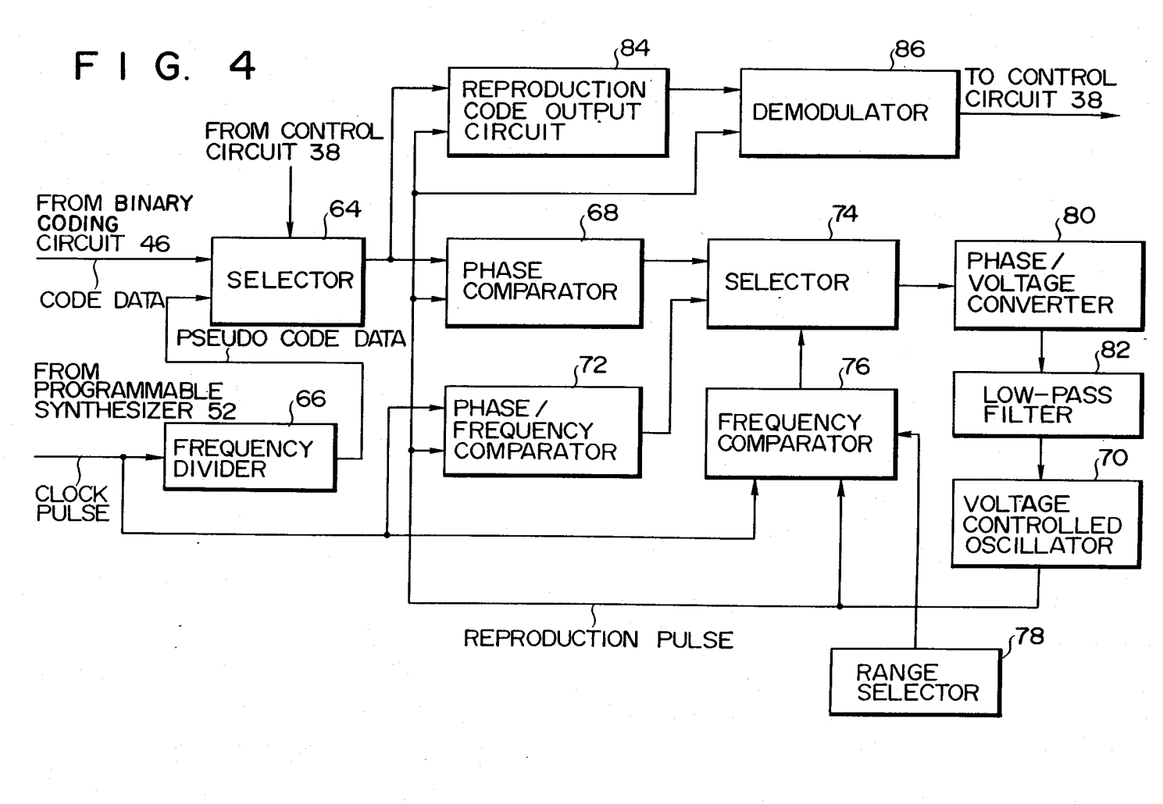
FIG. 4 shows a block diagram of a data demodulation circuit used in the system of FIG. 1 and which is an embodiment of the present invention.

The output signal from the light sensing element in the optical head 40 is binarized by binary coding circuit 46, and then is supplied to a demodulation circuit 48, which is illustrated in detail in FIG. 4. The demodulation circuit 48, for demodulating the image data, converts the binary code data derived from the binary coding circuit 46 in the reverse manner to that of the 2-7 coding. This conversion is timed by a clock pulse from a programmable synthesizer 52. The clock pulse is frequency variable and generated by frequency dividing a reference clock from a reference clock generator 50 at a frequency dividing ratio as specified by the control circuit 38 according to a track position on the optical disc 10. Since the optical disc 10 is rotated at a constant angular speed, the data must be modulated and demodulated at a constant linear density with respect to the track. To this end, in modulating and demodulating data, the frequency of the clock pulse must be varied according to the position of the track. It is for this reason that the frequency of the clock pulse is variable. The output signal of the demodulation circuit 48 is also supplied to the control circuit 38. The control circuit 38 is for controlling the overall image filing system according to a signal from an external device (not shown), for example, a host computer.

A memory 54 is also connected to the control circuit 38. In the filing system, to access each block, only the block number is supplied from the host computer. For this reason, from the block number as supplied, the filing system must obtain the track number and the sector number at the starting position of that block. As described above, it is necessary to vary the frequency of the clock pulse depending on the track position. To vary the clock frequency, a frequency dividing ration of the programmable synthesizer 52 must be varied according to the track number. To vary the frequency dividing ratio for each track is time consuming and requires additional and complicated circuitry. To avoid this, necessary data for each group consisting of 256 tracks are stored in the memory 54, as shown in Table 1. In this table, clock rate data corresponds to each clock frequency. The number of sectors corresponds to the number of sectors constituting each block. The starting sector number indicates a sector number at the starting position of the group. The first block number indicates a block number of the first block in the group.

TABLE 1

| Clock rate data | Number of sectors | Starting sector number | First block number |
|---|---|---|---|
| 1 | 40 | 00 | 000000 |
| 2 | 39 | 15 | 002459 |
| 3 | 38 | 40 | 005210 |
| ... | ... | ... | ... |

When a block number "10" to be accessed is supplied from the host computer, the control circuit 38 fetches the first block number "0", the starting sector number "00", the number of sectors "40", and the clock rate data "1" from the above table. Using the data fetched, the control circuit 38 computes the track number and the sector number at the starting position of the block of the block number "10". For the calculation, the following formula is used.

$$\{(\text{block number of the block to be accessed} - \text{the first block number}) \times \text{sector number} - \text{starting sector number}) \div 256 + \text{track number of the first block in the group} \quad (1)$$

When the above formula is calculated, the quotient indicates the track number and the remainder, the sector number. The track number of the first block in the group is the quotient when the following formula is calculated.

$$\text{Block number of the first block} \times \text{number of sector} \div 256 \quad (2)$$

If the number of blocks to be accessed is "10", the track number is "1" and the starting sector number is "144".

The control circuit 38 varies the frequency of the clock pulse depending on the track position by controlling a frequency dividing ratio of the programmable synthesizer 52 according to the clock rate data as obtained from the table 1 in the access mode. The frequency of the clock pulse for the outer side track is higher than that for the inner side track. By applying the clock pulse to the demodulation circuit 48 and the modulation circuit 56, the modulation and demodulation of the data can be performed so that the optical head 40 records and reproduces data at a constant linear speed with respect to the optical disc 10. After the track number is calculated, the control circuit 38 converts the track number into a scale value. Then, the control circuit 38 drives the linear motor driver 44 until the scale value reaches a position on the optical disc 10, which is detected by a position detector (not shown). In this way, the laser beam emitted from the optical head 40 hits the selected track. The control circuit 38 allows the record/reproduction to start when the optical head 40 reaches the selected position in the access mode. The record data supplied from the host computer to the control circuit 38 is converted into 2-7 code data in the modulation circuit 56. The 2-7 code data is then supplied to a laser driver 58. According to the code data supplied, the laser driver 58 drives the semiconductor laser in the optical head 40, thereby to record the data in the optical disc 10. The modulation circuit 56 modulates the recording data at the timing of the clock pulse from the programmable synthesizer 52. The relationship of data and code in the 2-7 code conversion is tabulated in table 2.

TABLE 2

| Data | Code |
|---|---|
| 11** | 1000**** |
| 10** | 0100**** |
| 011* | 001000** |
| 010* | 100100** |
| 000* | 000100** |
| 0011 | 00001000 |
| 0010 | 00100100 |

For "B3" (hexadecimal notation) of the recording data, code data obtained is "0100100000001000".

FIG. 4 shows in detail the demodulation circuit 48 in FIG. 1. The code data from the binary coding circuit 46 is supplied to the first input terminal of a selector 64. A clock pulse from the programmable synthesizer 52 is supplied to the second input terminal of the selector 64 through a frequency divider 66. The frequency divider 66 frequency divides the clock pulse to a factor of four to form pseudo code data. The selector 64 selects one of the code data and the pseudo code data according to a select signal from the control circuit 38, and supplies the selected data signal to the first input terminal of a phase comparator 68. The second input terminal of the phase comparator 68 is connected for reception to a reproduction pulse from a voltage controlled oscillator 70. The phase comparator 68 detects a phase difference at the leading edges of both the signals input thereto, and generates a signal corresponding to the phase difference. Thus, the phase comparator 68 detects only the phase difference. Therefore, when the frequencies of both the input signals are not equal, if the frequencies are such that one is an integer multiple of the other, the phase comparator 68 recognizes the input signals to be in phase. The selector 64 normally selects the code data. When a memory area storing no data on the optical disc 10 is accessed, that is, no code data is present, the selector 64 selects the pseudo code data. The clock pulse from the programmable synthesizer 52 and the reproduction pulse from the voltage controlled oscillator 70 are supplied to a phase/frequency comparator 72. The phase/frequency comparator 72 compares the phases of both the input pulses in one to one correspondance, and pulls in the reproduction pulse to the clock pulse, in frequency. The output signal of the phase comparator 68 and the output signal of the phase/frequency comparator 72 are supplied to a selector 74. The selector 74 is under the control of a frequency comparator 76. The comparator 76 compares the clock pulse from the programmable synthesizer 52 and the reproduction pulse from the voltage controlled oscillator 70. The frequency comparator 76 is further coupled with a range selector 78. The range selector 78 changes the tolerable range of the difference between the frequencies to be compared. The frequency comparator 76 supplies a select signal to the selector 74 depending on whether or not the frequency difference between the input signals is within the tolerable range. The output signal of the selector 74 is converted into a corresponding voltage signal by a phase/voltage converter 80. The voltage signal is passed through a low-pass filter 82 for noise removal, and supplied to the voltage controlled oscillator 70. The voltage controlled oscillator 70 synchronizes the reproduction pulse with the clock pulse in phase and frequency, and also with the code pulse in phase. The output signal of the selector 64, together with the reproduction pulse, is supplied to a reproduction code output circuit 84. Then, the circuit 84 produces 2-7 code data which is synchronized with the reproduction pulse. By the reproduction code output circuit 84, the code data read out from the reproduction code output circuit 84 is synchronized in phase with the reproduction pulse. The output signal of the reproduction code output circuit 84, together with the reproduction pulse, is supplied to a demodulator 86. In the demodulator 86, the 2-7 code data is reversely converted and input as reproduced data to the control circuit 38.

Figure 5:
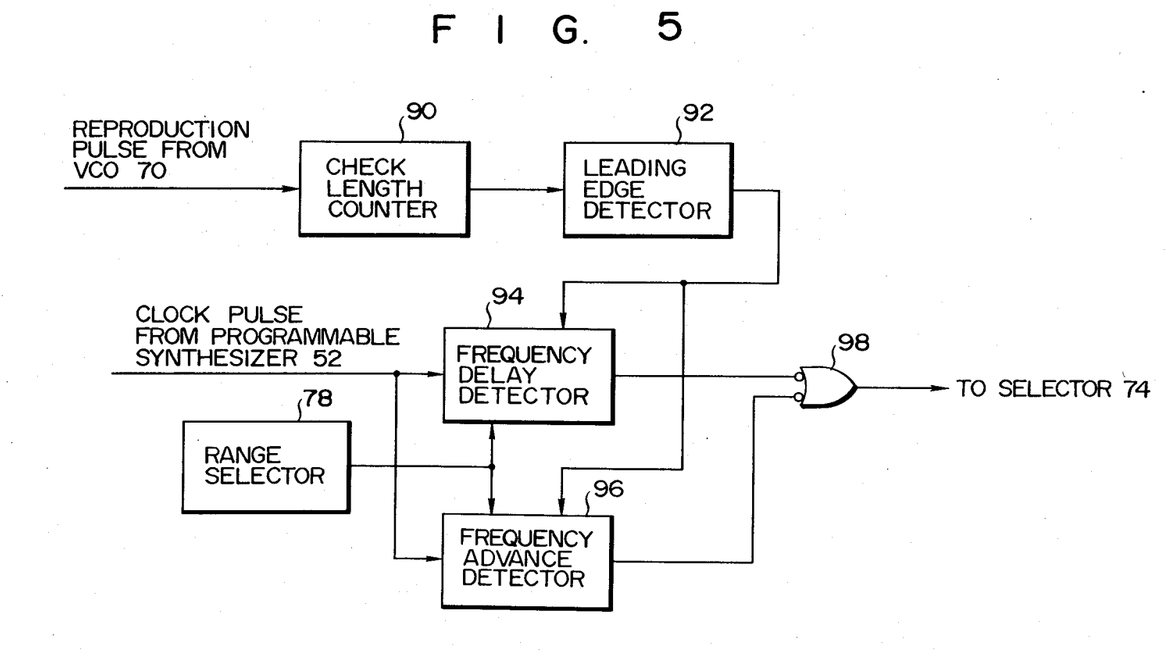
FIG. 5 shows a block diagram of a frequency comparator used in the demodulating circuit of FIG. 4.

FIG. 5 illustrates the details of the frequency comparator 76 shown in FIG. 4. The reproduction pulse from the voltage controlled oscillator 70 is supplied to a check length counter 90. The clock pulse from the programmable synthesizer 52 is input to a frequency delay detector 94 and a frequency advance detector 96. The check length counter 90 frequency divides the input reproduction pulse into, for example, a factor of 70. The output signal of the check length counter 90 is supplied to a leading edge detector 92. The output signal of the leading edge detector 92 is supplied as a detection timing signal to the frequency delay detector 94 and the frequency advance detector 96. The output signal of the range selector 78 in FIG. 4 serves as a signal to specify a tolerable range of a phase difference detection and is applied to the frequency delay detector 94 and the frequency advance detector 96. The frequency delay detector 94 and the frequency advance detector 96 each counts the clock pulses between the adjacent detection timing signals output from the leading edge detector 92, to detect whether or not the frequency of the reproduction pulse varies above the tolerable range. The output signals of the frequency delay detector 94 and the frequency phase advance detector 96 are supplied to the selector 74 through an EX-OR gate 98 as a select signal.

The operation of the image filing system will be described. In a record mode for recording data into the optical disc 10, the host computer supplies to the control circuit 38 a block number in which data is to be recorded. Using table 1 stored in the memory 54 and the formula (1), the control circuit 38 calculates the track number and the sector number at the head position of the block to be accessed, and obtains the clock rate data. The clock rate data is supplied to the programmable synthesizer 52. Using the clock rate data, the programmable synthesizer 52 frequency divides the reference clock, to obtain a clock pulse having the frequency based on the position of the track. The clock pulse thus obtained is supplied to the modulation circuit 56 and the demodulation circuit 48. When the track number is obtained, the control circuit 38 converts the track number into a corresponding scale value. The circuit 38 continuously drives the linear motor driver 44 to move the optical head 40, until the scale value reaches the head position as detected by the position detector (not shown). When the output signal of the sector counter 36 is equal to the sector number as calculated, the control circuit 38 starts the recording of data. The recording data is supplied from the control circuit 38 to the modulation circuit 56. In the modulation circuit 56, the data is modulated into 2-7 code at the timing of the clock pulse. The 2-7 converted code is supplied to the laser driver 58. The driver 58 drives the semiconductor laser in the optical head 40 according to the modulation signal of the 2-7 converted code as supplied. In this way, the code data is recorded at the specified location on the optical disc 10. As described above, as the track position is closer to the outside or the peripheral side of the optical disc 10, the frequency of the clock pulse supplied to the modulation circuit 56 is higher. Therefore, the code data is recorded on the disc as if the linear density is constant, thereby realizing a high density record of the data.

In the reproduction mode of the system, upon receipt of a block number to be accessed, the control circuit 38 obtains a track number, a sector number, and clock rate data. When the optical head 40 reaches a desired block position, the reproduction starts. The signal output from the optical head 40 is supplied to the binary coding circuit 46. The binarized signal, or the code data, from the binary coding circuit 46 is supplied to the demodulation circuit 48. The circuit 48 reversely converts the 2-7 converted code by counting the interval between the adjacent code data pulses using the reproduction pulse. The reproduced data is transferred to the control circuit 38.

In the demodulation circuit 48, the signal is processed in the following way, to be referred to in FIG. 4. The selector 64 normally selects the code data from the binary coding circuit 46. When the optical head 40 is accessing a non-recorded area on the optical disc 10, the selector 64 selects the output signals from the frequency divider 66. At this time, the code data is not read out, and no reference pulse is applied to a PLL circuit for generating the reproduction pulse at the succeeding stage. To prevent this, it is necessary to produce the pseudo code data, or the output signal from the frequency divider 66 which is phase synchronized with the code data. It is for this reason that the selector 64 selects the output signal of the frequency divider 66. The selector 74 selects the output signal of the phase comparator 68 for phase synchronizing the reproduction pulses with the code data or selects the output signal of the phase/frequency comparator 72 for phase/frequency synchronizing the reproduction pulse with the clock pulse.

The frequency comparator 76 as illustrated in detail in FIG. 5, detects the frequency of the reproduction pulse by using the clock pulse. If the frequency of the reproduction pulse is shifted above the tolerance range from a predetermined frequency, i.e., the frequency of the clock pulse, it produces a select signal. The select signal causes the selector 74 to select the output signal from the phase/frequency comparator 72. If the frequency of the reproduction pulse is within a tolerable frequency range, the selector 74 selects the output signal of the phase comparator 68.

Figures 6A, 6B:
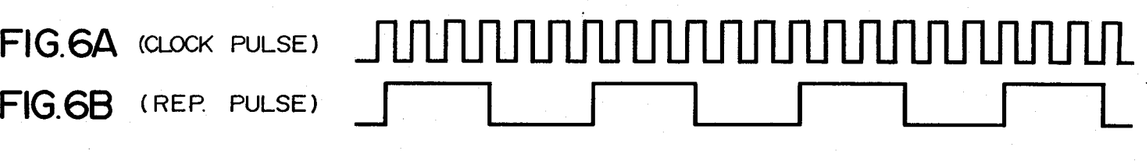
FIGS. 6A and 6B show the clock pulse and the reproduction pulse at a time of power on of the embodiment.
Figures 8B, 9A:
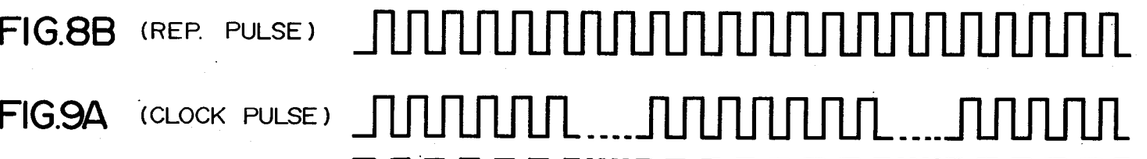
FIGS. 9A, 9B and 9C show the clock pulse, reproduction pulse and the check length pulse in the second mode.
Figure 9B:
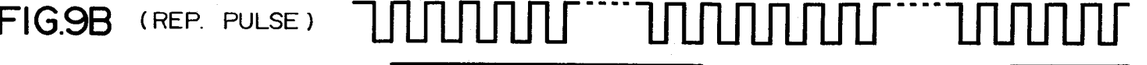
Figure 9C:
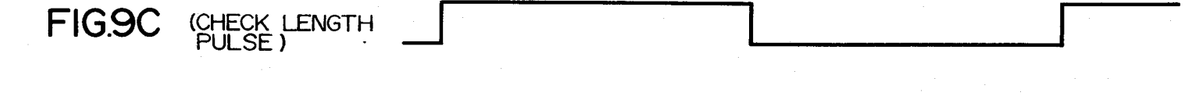

At the initial stage, the frequency of the reproduction pulse is not equal to the frequency of the clock pulse, as shown in FIGS. 6A and 6B. Therefore, the selector 74 produces the output signal of the phase/frequency comparator 72. This signal is passed through the phase/voltage converter 80 and the low-pass filter 82 and applied to the voltage controlled oscillator 70. Upon receipt of this signal, the voltage controlled oscillator 70 pull-in controls the reproduction pulse to be synchronized in phase and frequency with the clock pulse. The reproduction pulse is input to the check length counter 90, as shown in FIG. 5. The check length counter 90 produces one pulse every 70 reproduction pulses. The pulse signal from the check length counter 90 is detected by the leading edge detector 92, and then applied to the frequency delay detector 94 and the frequency advance detector 96 as the check length pulse. The clock pulse, the reproduction pulse and the check length pulse are shown in FIGS. 9A, 9B and 9C, respectively. The frequency delay detector 94 and the frequency advance detector 96 each count the clock pulses during the period from the instant the leading edge detector 92 produces one pulse till it produces the next pulse. When the counted value is less than 66 or not less than 74, these detectors produce each a logical "1" signal, which in turn is supplied as a select signal to the selector 74 via the EX-OR gate 98.

Figure 7A:
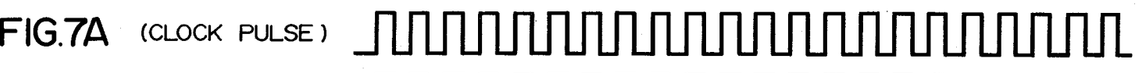
FIGS. 7A and 7B show the clock pulse and the reproduction pulse in the first mode.
Figures 7B, 8A:
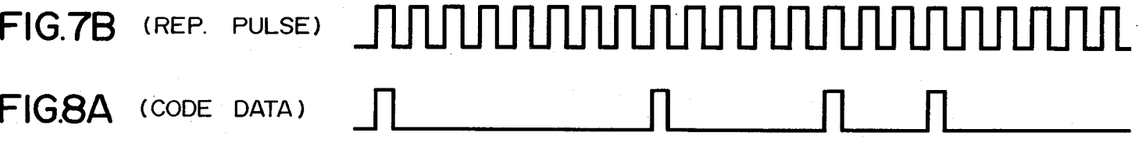
FIGS. 8A and 8B show the clock pulse and the reproduction pulse in the second mode.

When the reproduction pulse generated from the voltage controlled oscillator 70 has the same frequency and phase as those of the clock pulse as shown in FIGS. 7A and 7B, the selector 74 changes its state to allow the output signal of the phase comparator 68 to be supplied to the voltage controlled oscillator 70 through the phase/voltage converter 80 and the low-pass filter 82. The voltage controlled oscillator 70 lock-in controls the reproduction pulse synchronized in phase with the code data as shown in FIGS. 8A and 8B. Using this reproduction pulse, the reproduction code output circuit 84 shapes the code data read out from the optical disc 10. The shaped code data is supplied as 2-7 converter code to the demodulator 86. Then, the demodulator 86 returns the 2-7 converted code into the original state of the data by using the reproduction pulse.

If the PLL circuit for generating the reproduction pulse is affected by noise, an input voltage to the voltage controlled oscillator 70 temporarily varies, so that the frequency of the reproduction pulse varies. As described, above the reproduction pulse is merely phase compared with the code data in the phase comparator 68. Therefore, if the frequency changes, it is impossible to correct the changed frequency. It is noted, however, that at this time, the number of clock pulses as counted during the period of 70 reproduction pulses, changes above the frequency tolerable range from a predetermined number, 70. Either of the frequency delay detector 94 and the frequency advance detector 96 produces a noncoincident signal. By this output signal, the selector 74 selects the output signal from the phase/frequency comparator 72. As a result, the reproduction pulse is controlled, by the PLL circuit, so that it is synchronized with the clock pulse in both in both phase and frequency. Under this PLL control, the reproduction pulse has the same frequency as the clock pulse. Specifically, when the number of clock pulses as counted during the period of 70 reproduction pulses, falls within the range of 70 ±4, the state of the selector 74 is altered. Then, the output signal from the phase comparator 68 is supplied to the voltage controlled oscillator 70, again.

The tolerable range for the frequency shift detection, which is ±4 in the above-mentioned embodiment, may be changed by adjusting the range selector 78. For example, if the MFM code conversion, in place of the 2-7 converted code, is employed for the code conversion, the tolerable range can be set to that of the MFM code conversion. If the tolerable range is narrowed and the check length of the counter 90 is shortened to shorten the time taken for the comparison, the total check time can be shortened. Further, the system operation is stable if the tolerable range is set wide in the data read out mode. Thus, if the tolerable range is adjusted so as to match the case, the image filing system can be operated optimumly.

According to this invention, the reproduction pulse is synchronized to the code data in phase and its frequency shift is corrected using the clock pulse. During the frequency correction period the demodulated code data is completely error-corrected thus the code data is correctly reproducted. It is not necessary to add a precision device for detecting the frequency shift of the reproduction pulse. The frequency controller of this invention can be formed by an LSI circuit.

What is claimed is:

1. A data demodulation apparatus comprising:
 means for reading out code data from a recording medium, said code data having been modulated according to the timing of a clock pulse of a predetermined frequency and recorded in said recording medium;
 generating means, supplied with said clock pulse and said code data, for generating a reproduction pulse synchronized in both phase and frequency with said clock pulse in a first mode (pull-in control), and a reproduction pulse synchronized in phase with said code data in a second mode (lock-in control);
 means for demodulating code data according to the timing of said reproduction pulse;
 comparing means, connected to said generating means, for comparing the frequency of said reproduction pulse with that of said clock pulse, for setting said generating means in the second mode, when a frequency difference between the reproduction pulse and the clock pulse is within a tolerable range, and for setting said generating means in the first mode, when the frequency difference is not within the tolerable range.

2. A data demodulation apparatus according to claim 1, in which said generating means includes a voltage controlled oscillator, a phase comparator for detecting the phase difference between said code data and the output pulse of said voltage controlled oscillator, a phase/frequency comparator for detecting the phase difference and the frequency difference between said clock pulse and the output pulse of said voltage controlled oscillator, and a selector for selectively supplying the output signal of said phase comparator or said phase/frequency comparator to said voltage controlled oscillator, wherein the output signal of said voltage controlled oscillator serves as the reproduction pulse.

3. A data demodulation apparatus according to claim 1, in which said comparing means includes a check length counter for frequency dividing said reproduction pulse by a predetermined frequency dividing ratio, and detector means for counting said clock pulse between the adjacent pulses output from said check length counter and for checking whether or not a difference between the counted value and said frequency dividing ratio of said check length counter is within a tolerable range.

4. A data demodulation apparatus according to claim 3, said tolerable range of said detector means being variable.

5. A data demodulation apparatus according to claim 1, being said code data is 2-7 converted code data.

* * * * *